Oct. 27, 1970   G. M. CRANDELL ET AL   3,535,770
TEMPERATURE RESPONSIVE DEVICES AND METHOD OF FABRICATING SAME
Filed March 13, 1968   3 Sheets-Sheet 2
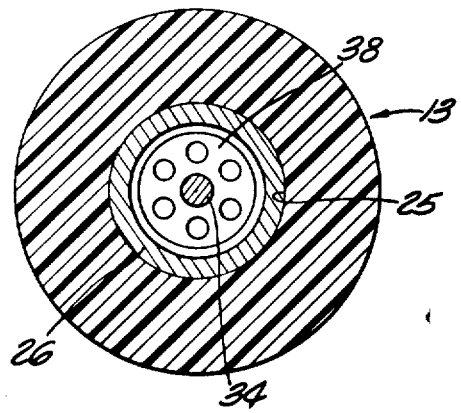
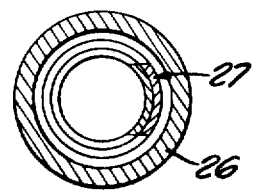
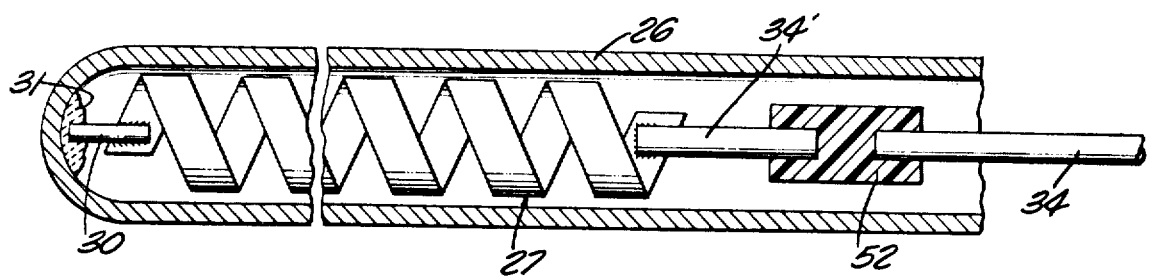
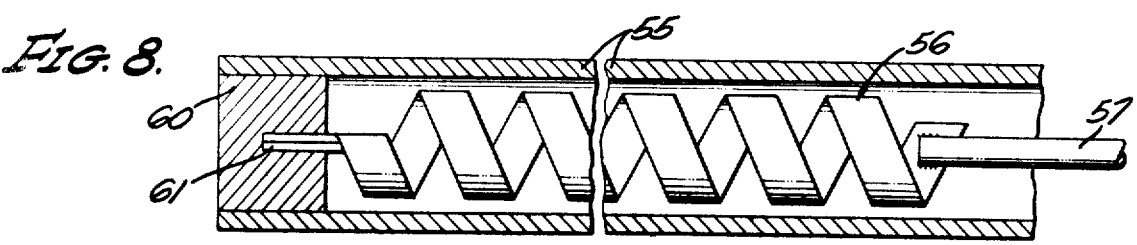
INVENTORS
GEORGE M. CRANDELL
RUSSELL C. GATES, JR.
BY Herzig, Walsh & Blackham
ATTORNEYS INVENTORS.
GEORGE M. CRANDELL
RUSSELL C. GATES, JR.
BY
Herzig, Walsh & Blackham
ATTORNEYS

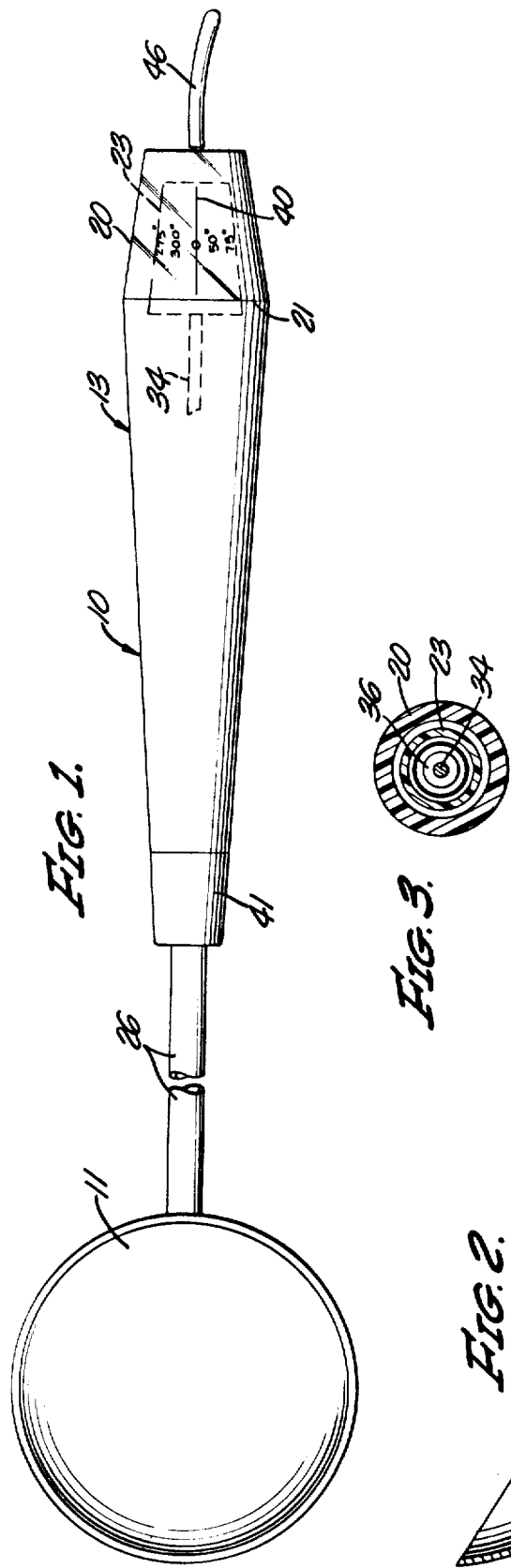
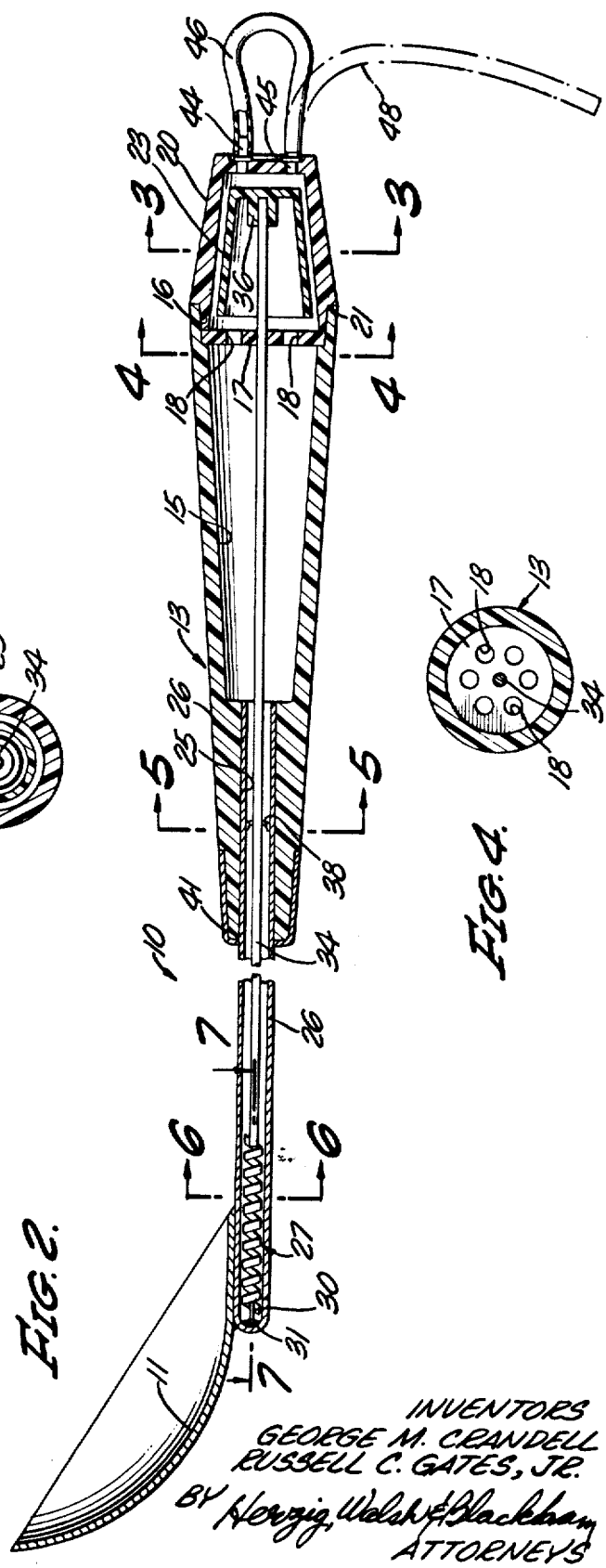

United States Patent Office 3,535,770
Patented Oct. 27, 1970

3,535,770
TEMPERATURE RESPONSIVE DEVICES AND
METHOD OF FABRICATING SAME
George M. Crandell and Russell C. Gates, Jr., Pacific Palisades, Calif., assignors to Gaydell, Inc., Santa Monica, Calif., a corporation of California
Continuation-in-part of application Ser. No. 468,394, June 30, 1965. This application Mar. 13, 1968, Ser. No. 716,694
Int. Cl. H01s 4/00
U.S. Cl. 29—475                                  3 Claims

ABSTRACT OF THE DISCLOSURE

The device of the invention is a temperature sensitive device embodied in a spoon having an indicator so that the temperature affecting the spoon is indicated. The spoon has a handle embodying a tubular stem within which is a bimetal element adjacent to the bowl of the spoon. This element rotates a shaft connected to a rotary temperature indicator. In the cavity inside the handle and particularly around the temperature sensitive element, there is helium gas to enhance the response time of the temperature responsive element. The temperature responsive element is secured to its housing by soldering to enhance the heat conductive qualities. An improved method is provided for fabricating the device to avoid damage to the bimetal element. A tube is closed at one end. A pellet of solder is dropped into the tube from the other end. The bimetal element is inserted from the other end and then heat is applied at a temperature necessary to melt the solder and secure the element to the tube. Preferably the tube is closed by way of a silver plated brass plug to which the solder can adhere.

SUMMARY OF THE INVENTION

This invention relates to improvements in temperature responsive devices, particularly by way of promoting heat transfer between the ambient environment and the temperature responsive element. The invention provides for heat transfer by the use of a fluid medium having a high coefficient of thermal conductivity, more particularly helium which has an unusually favorable coefficient of thermal conductivity. The invention is particularly adapted to temperature responsive devices using bimetal elements as will be made clear hereinafter.

In an exemplary form of the invention as described herein, it takes the form of improvements in a thermometer spoon or temperature indicating spood of the type described in Pat. No. 3,277,714. This application is a continuation-in-part of application Ser. No. 468,394 filed June 30, 1965. For this application a bimetal element has inherent advantages over other types of sensors, these advantages including reliability and durability and rotary motion. However, a bimetal sensor ordinarily has the disadvantages of slower response time and the requirement of a deeper fluid immersion level in the substance being measured. It is a primary object of this invention to provide improvements overcoming these deficiencies as respects a bimetal sensor. That is, the object is to increase the speed of response of the element and to reduce the required fluid or liquid immersion level that the element must be subjected to.

It was observed with respect to thermometer spoons that the speed response varied from one to another, and it was discovered that this variation depended on the amount of moisture sealed inside the spoon. It was discovered that by having a substance of greater thermal conductivity in the space around the temperature sensor rather than air, this would increase the speed of response of the temperature sensing element within the spoon. By exhausting the air from the interior of the spoon, the moisture can be eliminated and the air could be replaced by substance of greater thermal conductivity.

Thermal conductivity of a substance is a measure of the ability of the substance or material to transmit heat by conduction alone. High pressure causes an increase in thermal conductivity. Conductivity is proportional to the square root of the absolute temperature, that is, it depends upon the temperature. Thermal conductivity of gas is very low compared with metal. However, there are very substantial differences in coefficient of thermal conductivity of different gases. For example, measured in $10^{-3}$ cal/cm/sec/deg the coefficient of thermal conductivity of air at 220° F. is .0182. The coefficient of thermal conductivity of helium at 220° F. is .0994. The coefficient of thermal conductivity of hydrogen at 220° F. is .129. The coefficient of thermal conductivity of a number of other gases is comparable to that of air. Hydrogen is a colorless, odorless, non-toxic gas and is the lightest gas known, but it is flammable. Helium is an inert non-toxic colorless, odorless, tasteless gas and has extremely low density.

Referring to the speed of response of the temperature responsive element, it should be observed that in the matter of temperature indicating spoons, it is imperatively necessary to have a very fast response time. This is necessary because in connection with various cooking processes, it is necessary to be able to immerse or partly immerse the spoon in the hot material quickly or momentarily and withdraw it immediately and read the temperature. This is to be distinguished from types of temperature indicating devices such as those that are stuck into meat or the like where there is no need for quick response, but rather the temperature is read after expiration of a considerable amount of time. Considerable research was undertaken to find a way of achieving very fast response time with only limited immersion of the spoon. It was discovered that with the use of helium as the heat transfer medium, results were obtained which were unexpected and rather startling.

With respect to speed of response and the limited amount of immersion necessary, further improvements were realized in the manner of providing a heat conductive path as between the bimetal element and its housing, that is, the tube in which the element is situated. Bimetal thermostatic elements are, of course, sensitive instrumentalities and their accuracy may be impaired by subjecting them to excessive temperature. Conventionally, the bimetal element is mounted or situated in the end of a steel tube. It has been the practice to use a tube, the end of which is closed by means of a plug or cap which is brazed into or onto the end of the tube with the bimetal element attached by brazing to this plug or cap. In the process of blazing the plug or cap onto the end of the tube, the bimetal element may become subjected to a brazing temperature of 800° F. to 1200° F. which may impair or damage it. To overcome this deficiency a process was evolved to make it unnecessary to expose the bimetal element to such excessive temperatures. By the improved process the bimetal element is inserted from the other end of the tube with the first end already closed. Before inserting the bimetal element a pellet of solder is dropped into the tube with the tube in a vertical position. Then heat is applied only sufficiently to melt the solder and in a limited area, the bimetal element having an extending projection which immerses into the solder and when the heat source is removed the bimetal element becomes attached to the solder and the end of the tube. Difficulties can be encountered in that the solder may not adhere to the steel tube. To overcome this, further improvements were made in the process. By these improvements a plug is used in the end of the tube, preferably the plug being silver plated brass with the end of the tube being closed over the plug by an appropriate process such as spinning as will be described in detail hereinafter. The solder pellet will then, after melting, adhere to the plug and will hold the bimetal element securely attached.

The process of filling the device with helium is effected in a simple way. A group of the devices may be simply placed in a chamber which is then evacuated of air. Each device is provided with a small aperture; the chamber is then filled with helium which fills the devices and due to its low density does not readily come out. That is the devices may be then removed from the chamber and the apertures in them easily closed by heat sealing.

From the foregoing, it will be readily observed that additional objects of the invention reside in improving the heat transfer capabilities without impairing the quality of the bimetal temperature responsive element; in methods of fabricating the device and in enclosing the gaseous heat transfer fluid.

While the invention has particular adapatability in temperature indicating spoons it has applicability in other temperature responsive devices embodying bimetal elements.

The foregoing sets forth the basic nature of the invention and the primary objectives thereof. Further objects and additional advantages of the invention will become apparent from the following detailed description and annexed drawings wherein:

FIG. 1 is a plan view of a thermometer spoon embodying the invention;

FIG. 2 is a sectional view of the spoon of FIG. 1;

FIG. 3 is a sectional view taken along the line 3—3 of FIG. 2;

FIG. 4 is a sectional view taken along the line 4—4 of FIG. 2;

FIG. 5 is a sectional view taken along the line 5—5 of FIG. 2;

FIG. 6 is a sectional view taken along the line 6—6 of FIG. 2;

FIG. 7 is a partial sectional view showing the use of a heat dam in the shaft of the thermostatic element;

FIG. 8 is a partial sectional view of a housing for a temperature responsive element with a plug in the end of the housing;

Figure 9:
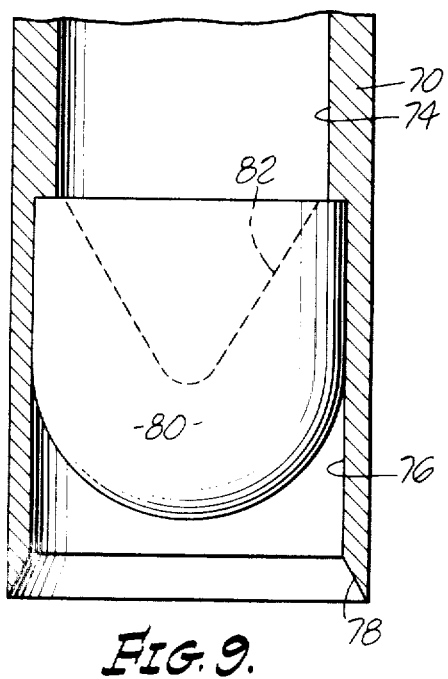
Figure 10:
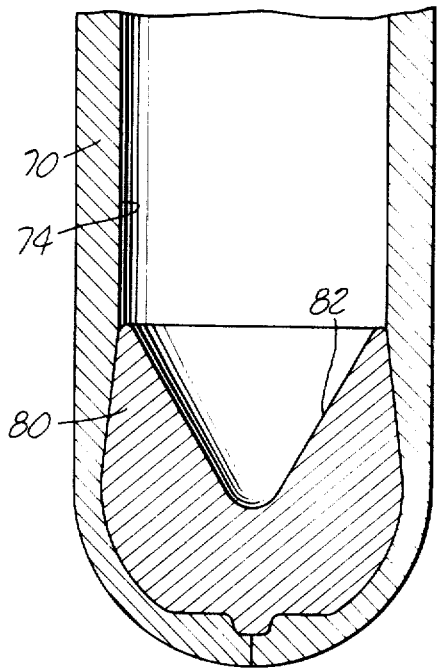
Figure 11:
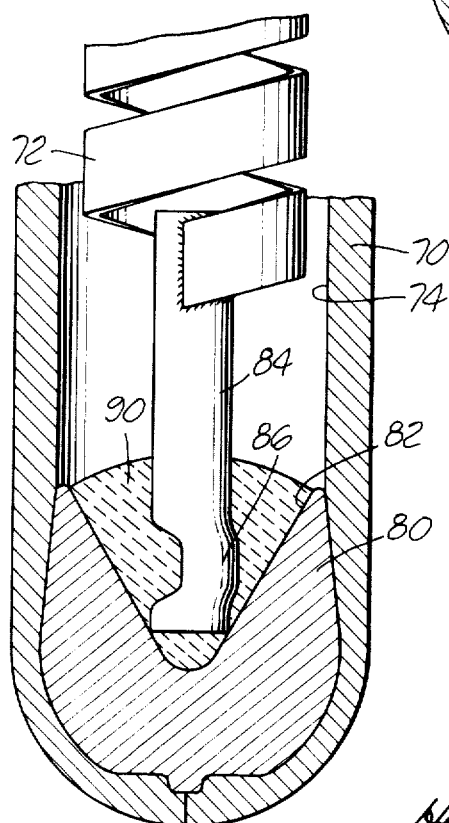

FIGS. 9, 10, and 11 are partial sectional views of the thermometer spoon illustrating the method of fabrication.

In FIGS. 1 and 2 of the drawings, there is illustrated a temperature responsive spoon, that is a temperature indicating spoon designated generally at 10. The spoon has a stirring or bowl portion 11 which as shown is circular and is dished. Numeral 13 designates a handle portion which is tapered having a tapered bore as shown at 15. At the end of the handle is a counterbore 16 and received in this counterbore is a disc member 17 having holes 18 in it. Numeral 20 designates a tapered transparent window member having an annular groove 21 at the end which is received within the counterbore 16 so that the shoulder at the end of the annular groove abuts against the end of the handle 13. The end part 20 forms a window for viewing a tapered indicating rotor 23 within the end cap member 20.

The end part of the handle 13 has a bore 25 within which is received a tubular member or stem 26 forming a housing for a temperature sensing element 27. Preferably this element is a helical bimetal element which may be made of conventional materials. The end of the tubular housing 26 is secured by suitable means to the bowl 11. The end of the bimetal element 27 is secured to a short heat conductive stem 30, the end of which is secured by solder 31 to the end of the housing or stem 26. This arrangement promotes the transfer of heat through the housing to the bimetal element and thereby enhances the speed of response. Within the tube or stem 26 is a shaft 34 connected to one end of the bimetal element 27 and extending through the bore 15 in the handle 13. It extends through and is journalled in the disc 17 and its end is received in a boss 36 formed in the end of the motor 23. The shaft 34 is journalled in a bearing 38 in the tube 26 having openings therein as may be seen in FIG. 5. The indicating rotor 23 is provided with indications as shown in FIG. 1 so as to indicate temperature by way of the index line 40. Fitted on the inner end of handle 13 is a ferrule 41.

The bimetal element 27 may be of conventional type formed of materials of different coefficient of thermal expansion sandwiched together. Where two metals are used, one may be the material known as Invar which is a well known nickel-iron alloy. The other, having a higher coefficient of thermal exapnsion may be of brass, for example. Also, materials comprising ceramic and metal may be used, the ceramic material normally having a low coefficient of thermal expansion as well as being hard, unporous and having high strength and temperature resistance, the other layer being made of a metal having a higher coefficient of thermal expansion such as brass.

The transparent cap member 20 may be made of any clear durable material such as Lexan, plastic or glass. The bowl and stem are preferably made of a metal such as stainless steel and the handle 13 may be made of plastic.

Numeral 48 designates another flexible tube which may be initially attached to the nipple 45. With the nipple 44 kept closed, the interior of the spoon may be completely evacuated of air and moisture. While the nipple 44 is kept closed, a gaseous medium is injected into the interior of the spoon. This medium is selected from a gas having relatively high coefficient of thermal conductivity and as indicated in the foregoing, such as helium or hydrogen and preferably helium. The helium is able to completely fill the interior of the spoon, passing through the openings in the disc 17 and through the disc or bearing 38 so that the thermostatic element 27 is completely enclosed in a gaseous medium. As indicated in the foregoing, the thermal conductivity of a substance is a measure of the ability of the material to transmit heat by conduction alone. High pressure causes an increase in thermal conductivity. Conductivity is proportional to the square of the absolute temperature. The thermal conductivity of many substances including gases has been determined. Helium has a high coefficient of thermal conductivity, but as indicated in the foregoing, also has the additional characteristics of being odorless, tasteless, colorless and inert and has a very low density. After the helium or gaseous medium has been injected, the nipples may be closed by the tube 46 as shown. The nipples 44 and 45 and the tubes show one manner of injecting the gas into the device and then sealing it therein. This may be accomplished in other ways and after insertion of the gas the openings having the nipples 44 and 45 in them may be permanently sealed, of course.

The operation of the device will be well understood by those skilled in the art. Whenever the bowl part 11 of the spoon is subjected to the temperature of any material being stirred or the like, the bimetal element 27 will be effected to rotate the shaft 34 and the rotor 23 to thereby indicate the temperature through the transparent end cap 20. Temperature changes are very rapidly transmitted to the element 27 so that there is a quick response by the indicating rotor 23 and the required immersion depth is reduced.

Response time of the thermostatic element might be affected by dissipation of heat from the element along the shaft 34. To overcome this a construction as shown in FIG. 7 is preferred. In this construction there is inserted a heat dam as designated at 52 in the form of a heat insulative member which is interposed in the shaft 34 that is between the shaft 34 an shaft stem 34′ between the heat dam 52 and the end of the bimetal element 27.

The heat dam may be made of plastic or any material which is a heat insulator and does not transfer or conduct heat readily. In this way the heat at the temperature sensing element 27 is not lost by conduction through the shaft 34 and the response time is thereby enhanced. It should be understood that the heat dam construction as shown in FIG. 7 is incorporated in the structure shown in FIGS. 1 and 2, FIG. 7 being an enlarged view to more clearly illustrate the construction.

FIG. 8 shows a part of a housing 55 having a helical bimetal element 56 in it connected to a shaft 57. In the end of the housing is a plug 60 of suitable material having an end part 61 of the bimetal element inserted into the plug. FIG. 8 shows a conventional construction to illustrate the disadvantage thereof in that a separate plug 60 must be used to close the end of the housing. In the preferred construction of the herein invention, as shown in FIG. 2, tube 26 is a closed end tube; a plug such as plug 60 shown in FIG. 8 is not used since with such an arrangement it is difficult or impossible to provide an airtight seal.

FIGS. 9, 10 and 11 of the drawings illustrate a preferred method of fabricating the temperature responsive device. Numeral 70 indicates the tube or stem which contains the thermostatic element which is designated at 72 in FIG. 11. The tube 70 has a bore 74 and a counter bore 76. The end of the bore 74 is chamfered as shown at 78. Numeral 80 designates a plug having a configuration as shown in FIGS. 9, 10, and 11 and preferably being made of brass and silver plated. The plug 80 may be formed and plated by known processes. The plug 80 is inserted into the counter bore 76 with a press fit and held therein. Plug 80 is formed to have a conical depression 82 in it as shown. The end of the tube 70 is then formed or closed around the end of the plug 80 as shown in FIGS. 10 and 11. This is a simple operation which can be achieved using various known processes such as spinning or otherwise. The chamfered end of the tube 70 comes into a closed position as illustrated in FIGS 10 and 11. The end of the tube 70 may be closed in other ways as well.

After the end of the tube 70 has been closed as described, it is held in an upright position and in a fixture and a pellet of solder is dropped into it from its open end. The pellet drops down into the recess 82 and in contact with the plug 80. The bimetal element 72 is then inserted into the tube 70 from its open end on its stem. At the end of the element 72 is a conductive extending stem or projection 84 having an offset 86 which comes into contact with the pellet of solder. Heat is then applied to the closed end end of the tube 70 in a limited amount sufficient to melt the solder pellet, the heat being applied only to a limited area of the tube 70. The solder melts and the stem 84 extends into it and then upon cooling, the stem 84 is secured to the plug 80 and the tube 70 by way of a good heat conductive metal path. In this manner the bimetal element 72 has not been subjected to excessive temperatures which might impair its sensitivity and accuracy.

The filling of the temperature indicating devices with helium can be accomplished in a simple way. A group of the devices as shown in the FIG. 2 may be placed in an enclosure which can be evacuated. The devices are provided with only a single small aperture such as the aperture 45 in plastic end cap 20 shown in FIG. 2. The enclosure is evacuated of air and then filled with helium which fills the temperature indicating devices thru their apertures. The devices may then be taken out of the said chamber; the helium does not come out of them because of its low density. The apertures such as the aperture 45 in the plastic end caps can then be readily closed by means of the application of heat which seals the apertures.

From the foregoing those skilled in the art will observe that the invention as described herein achieves and realizes all of the objects and advantages as outlined in the foregoing, as well as having many additional advantages that are apparent from the detailed description. It should be understood that the invention is applicable not only to various types of temperature sensing elements but to any device where it is desired to facilitate the transfer of heat from an environment to a particular element. In the exemplary embodiment of the invention shown, this is accomplished by way of the use of helium or other gas having a relatively high conductivity around the bimetal element in a position to transfer heat from the surroundings to the element.

The foregoing disclosure is representative of preferred forms of the inventions and is to be interpreted in an illustrative rather than a limiting sense, the invention to be accorded the full scope of the claims appended hereto.

What is claimed is:

1. A method of fabricating temperature responsive devices wherein a sensitive bimetal element is secured within and adjacent an end of a stainless steel tubular member, comprising the steps of: forming a plug of material having a surface to which solder will readily adhere, inserting said plug in one end of said tubular member, contracting the end of the tubular member on said plug to hold and substantially seal said plug in said tube, inserting a pellet of solder from the other end of the tube, inserting a bimetal element from the other end of the tube to said one end and applying heat to the end of the tube to melt said solder and to thereby adhere the bimetal element to said plug when the said solder solidifies.

2. A method as in claim 1 including the step of placing the device in a chamber, evacuating the chamber, putting helium gas into the chamber and filling the device with helium through an aperture, removing the device and closing the aperture.

3. A method as in claim 1 including the step of forming a recess in the end plug to receive the pellet of solder.

References Cited

UNITED STATES PATENTS

| 2,191,765 | 2/1940 | Lohman | 73—362 |
| 2,659,790 | 11/1953 | Jurgensen | 29—623 XR |
| 2,755,127 | 7/1956 | Schlaich. | |
| 2,919,320 | 12/1959 | Edwards et al. | 29—622 XR |
| 2,942,056 | 6/1960 | Yardney. | |
| 3,277,714 | 10/1966 | Crandell et al. | 73—343 |
| 3,345,593 | 10/1967 | Grengg | 29—630 |
| 3,396,460 | 8/1968 | Wetmore | 228—56 XR |
| 1,188,055 | 6/1916 | Faile | 339—275 |
| 1,970,022 | 8/1934 | Pietenpol et al. | 29—630 |
| 2,753,620 | 7/1956 | Yardney | 29—630 |

FOREIGN PATENTS 803,958 Great Britain.

JOHN F. CAMPBELL, Primary Examiner

R. W. CHURCH, Assistant Examiner

U.S. Cl. X.R.

29—422, 470.5, 592, 622; 73—362.8